June 15, 1943.  M. SCHWARTZ ET AL  2,321,945
CAMERA ATTACHMENT
Filed July 24, 1941     2 Sheets-Sheet 1
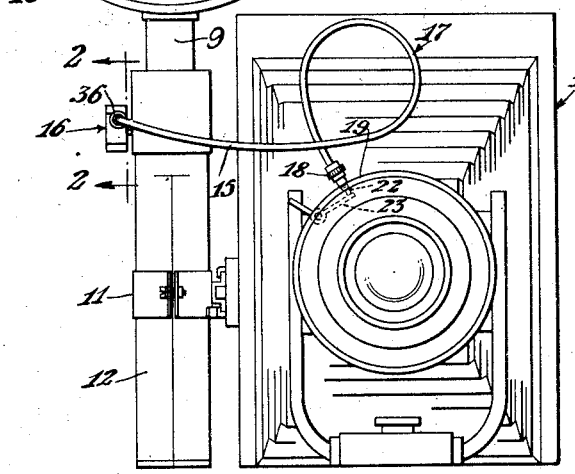
INVENTORS
MORRIS SCHWARTZ
WILLIAM CASTEDELLO
BY
ATTORNEY June 15, 1943.   M. SCHWARTZ ET AL   2,321,945
CAMERA ATTACHMENT
Filed July 24, 1941   2 Sheets-Sheet 2
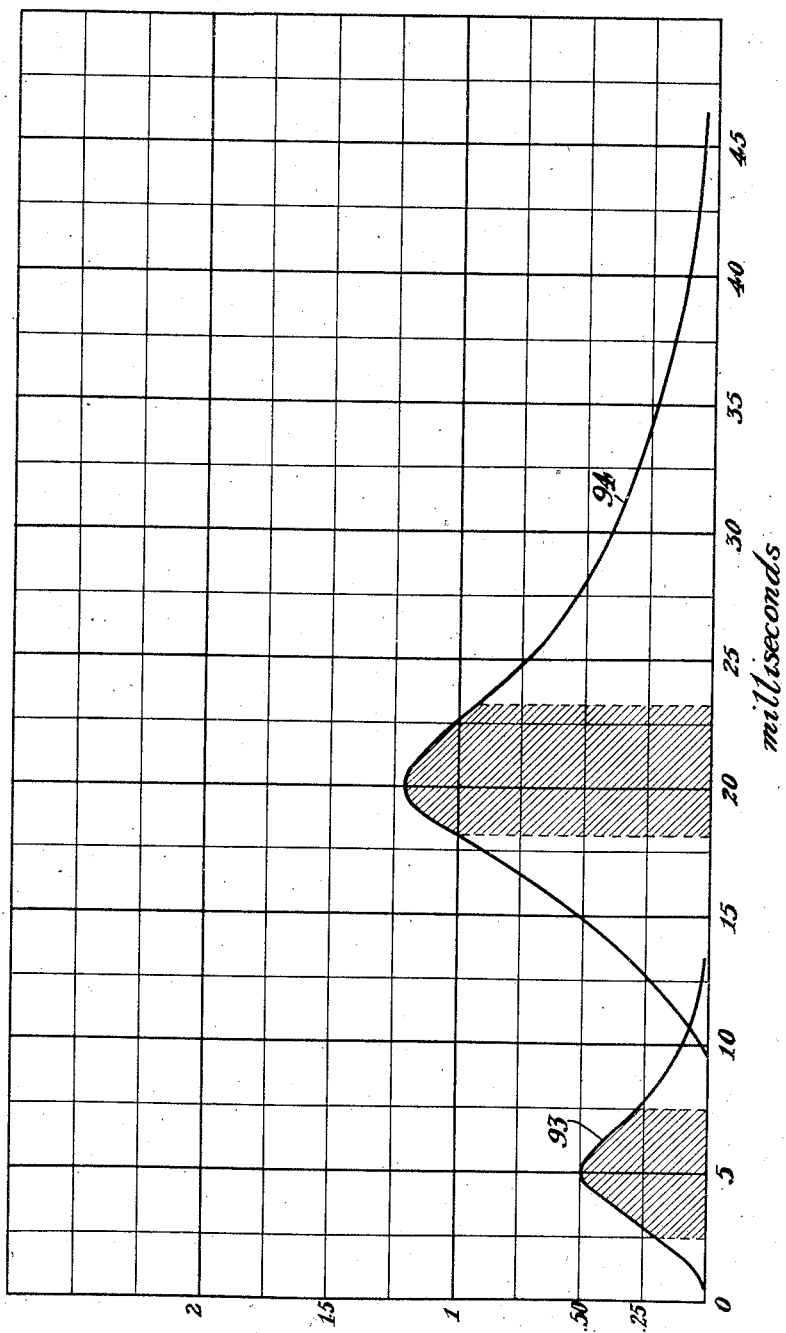

Patented June 15, 1943

2,321,945

UNITED STATES PATENT OFFICE 2,321,945

CAMERA ATTACHMENT

Morris Schwartz and William Castedello, Stamford, Conn., assignors to The Kalart Company, Inc., Stamford, Conn.

Application July 24, 1941, Serial No. 403,819

10 Claims. (Cl. 67—29)

The present invention relates primarily to a camera shutter and flashlight synchronizer and more particularly to an improved and novel apparatus for operating a camera shutter and igniting a photo flashlight bulb in proper timed relation with respect to one another.

For best results in the use of photo flash or flashlight bulbs in conjunction with cameras, the operation of the camera shutter has to be properly timed and synchronized with the flash of the flash bulb so that during the time the shutter operates or is open, the photo flash bulb is producing its maximum illumination. If the flash of the bulb and the camera shutter are not properly timed, unsatisfactory results are obtained as the intense portion of a flash may occur either before or after the operation of the shutter. Shutters of present day cameras may operate at relatively high rates of speed up to one two-hundredths of a second and even faster when used in taking pictures of moving objects particularly, and with such quick acting shutters considerable illumination of the objects photographed is required necessitating the operation of the shutter during the period of maximum illumination produced by the photo flash bulb which period is relatively short in duration. After ignition of a photo flash bulb it requires a measurable length of time for it to reach its maximum illumination which may or may not be the same length of time required for a camera shutter to open after being tripped. If the camera shutter is operated or opened simultaneously with the ignition of the flash bulb, the maximum illumination may be produced after the shutter is operated. Likewise, a camera shutter tripped too long a time after the ignition of the flash bulb will be open after the maximum illumination has been produced. Accordingly it is necessary for best results to produce some adjustable time delay between the tripping of the camera shutter and the ignition of the flash bulb in order that the shutter be operated during the period of maximum illumination. In accordance with the above, it is one of the primary objects of the present invention to provide means for definitely timing the operation of a camera shutter with the ignition of a photo flash bulb.

A further object of the invention resides in the provision of means for adapting the shutter and flashlight synchronizing unit for use in cameras employing shutters of various types and speeds.

Different sizes and types of bulbs used in flashlight camera work have different time characteristics, that is, with different bulbs it requires a longer or shorter period of time after the ignition of the bulb for it to reach its maximum illumination and a synchronizing unit adjusted in conjunction with a camera shutter to operate properly with one size of photoflash bulb would not operate at the maximum efficiency with a bulb of another size. Accordingly, it is another object of the invention to provide means for adapting the synchronizer for use with various sizes and/or types of bulbs without the necessity of performing an involved adjustment.

Another object of the invention resides in provision of a novel and improved arrangement for resetting the synchronizer unit, the resetting being performed automatically on the release of the operating member and thus does not require a separate resetting operation.

These and other objects of the invention will be apparent in the following detailed description when taken in conjunction with the accompanying drawings, in the latter of which:

Fig. 1 is a front elevational view of a camera showing the manner in which a flashlight battery, bulb and reflector are associated therewith together with the synchronizing unit;

Fig. 2 is an enlarged vertical sectional view of the synchronizer unit taken substantially on line 2—2 of Fig. 1;

Fig. 3 is an enlarged detailed view of the synchronizer unit with the cover plate removed;

Fig. 4 is a sectional view taken substantially on line 4—4 of Fig. 3;

Fig. 5 is a sectional view taken on line 5—5 of Fig. 3;

Fig. 6 is a sectional view taken on line 6—6 of Fig. 3 showing one adjustment of the synchronizer unit;

Fig. 7 is a view similar to Fig. 6 showing a second adjustment of the synchronizer unit;

Fig. 8 shows a modified arrangement of attaching the release cable to the synchronizer unit; and Fig. 9 is a graph illustrating the time and illumination characteristics of two different photo flash bulbs.

Referring first to Fig. 1, the camera, indicated in general by reference numeral 10, has attached thereto by means of a clamp 11, which may be of a well known type, a flashlight battery casing 12. Extending from the upper end of the casing 12 and secured thereto is a reflector shell 13. A photoflash bulb 14 centered in the reflector 13 is supported at its lower end in a socket member 9 at the upper end of the casing 12. The synchronizer unit referred to in general by reference numeral 16 is attached to the side of the battery casing 12 and has extending therefrom a flexible release cable of the well known type indicated in general by reference numeral 17. The other end of the cable 17 terminates in a collar 18 secured to a cable release socket in the shutter housing 19 of the camera 10. The cable 17 is of the type commonly used on cameras and comprises a flexible outer casing 15 surrounding a flexible inner core 21, Figs. 3 and 4. The end of the core associated with the cable release socket terminates in a plunger rod 22 and cooperates with the bell crank 23 comprising a part of the shutter arrangement to trip the shutter when the core 21 is operated so that the end of the core extends from the casing 15.

The synchronizer unit 16 comprises a casing or shell 24 having a bottom 24a, ends 24b, and sides 24c, all formed integral with one another. A top cover plate 26, Figs. 5, 6 and 7, serves to close the shell 24 or unit 16 and is held in place by screws such as 27 threaded into the end portions 24b of the shell. The sides and ends of the shell 24c and 24b, respectively, are recessed to receive the top cover plate 26.

Threaded into the left hand end 24b of the shell is a hollow sleeve member 28. The left hand end of the sleeve member 28 has an externally threaded flange 29 formed integral therewith which by means of the threads engages the internal threads 31 of a collar 32. The left hand end of the collar 32 has external threads 33 formed thereon which in turn engage internal threads 34 of a second collar 36. One end of the casing 15 of the release cable 17 terminates in the left hand end of the second collar 36 while the core element 21 of the release cable extends through the above mentioned collars 36 and 32 into the sleeve member 28. A disc-shaped member 37 inside the collar 36 abuts a shoulder 38 therein and the left hand end of the threaded portion 33 of collar 32 cooperates with a collar 39 to guide the movement of the core member.

By threading the collar 32 along the sleeve 28, the effective length of the core 21 of the release cable relative to the length of the casing 15 may be varied. A set of indications 40 on the sleeve 28 assists in determining the adjusted position of the collar 32 along the sleeve 28. By means of this adjustment of changing the effective length of the core 21, the cable release may be associated with shutters having different operating characteristics as some shutters require different amounts of movement of the cable release core than others to trip. The adjustment of the collar 32 on the sleeve 28 also provides an adjustment which cooperates with the synchronizer unit in a manner hereinafter set forth.

The right hand end of the core member 21 as shown in Fig. 4 is of enlarged cross section and terminates at a point 41 in the sleeve 28. Abutting the right hand end of the core member 21 is the left hand end of a plunger rod 42. The sleeve 28 guides the left hand end of the plunger rod 42 while the right hand end thereof is guided in a sleeve 43 extending from the right hand end 24b of the shell. The sleeve 43 has a flange 44 formed integrally on the left hand end thereof disposed on the inside of the shell 24 while secured to the right hand end of the sleeve 43 is an operating button 46. The sleeve 43 is arranged to slide along the plunger rod 42 and through the right hand end of the shell 24b in a manner which will hereinafter be described. Encircling sleeve 43 is a rubber collar 45 which functions as a shock absorber when the button 46 is operated against right hand end 24b of shell 24.

The right hand end of the plunger rod 42 is of smaller diameter than the left hand end and a shoulder 47 is formed on the plunger rod where the diameter changes. In abutting relation with the right hand side of the shoulder 47 is a member 49 of square cross-section arranged to slide along the section of smaller diameter of the plunger rod 42 in a manner hereinafter set forth. The right hand side of the member 49 as shown in Fig. 5 slides along the bottom 24a of the shell 24 and is thus prevented from rotating on the rod 42.

A spring 51 is coiled about the rod 42 at the right of the member 49, Figs. 3 and 4, with its left hand end seated in the member 49 and the right hand end seated in a recess of the sleeve 43. The spring 51 tends to elongate and slide the member 49 together with the plunger rod 42 to the left, as shown in Figs. 3 and 4.

A single wire spring 52 is coiled about a post 53 in the shell 24 and has the free end 54 thereof in operative relation with the flange 44 on the left hand end of the sleeve 43. The spring 52 thus normally holds the flange 44 of the sleeve 43 against the inside of the right hand end 24b of the shell. A cap 56, Fig. 4, on the extreme right hand end of the plunger rod 42 normally abuts the extreme right hand end of the sleeve 43 and thus the spring 51 is prevented from sliding the plunger rod 42 and member 49 to the left. The strength of the spring 52 relative to the strength of the spring 51 is such that the spring 52 predominates and thus the flange 44 of the sleeve 43 is held against the right hand end of the shell in its normal position.

Pivotally mounted on a shoulder screw 57 on the shell 24 is a latch 58. The latch 58 is biased to pivot on the shoulder screw 57 in a counterclockwise direction by a spring 59 attached by a screw 61 to the latch. Formed on the upper side of the latch 58, as shown in Fig. 3, is a projection 62 which cooperates with a notch 63 in the member 49 to latch the said member in a manner hereinafter pointed out.

The upper side of the member 49, as shown in Fig. 3, has teeth such as 64 formed thereon adapted to cooperate with teeth 66 of a pinion 67. The pinion 67 is pivotally mounted on a stud 68 screwed into and extending from the back portion of the shell 24. Fixed to the pinion 67 and adapted to rotate therewith is a disc 69 preferably constructed of brass and of sufficient weight to have a substantial amount of inertia.

The upper end 71 of the stud 68 extends from the outside of the shell 24 and provides a means for electrically connecting the synchronizing unit 16 with the appropriate receptacle in the battery casing 12. A second connecting stud 72 extends from the shell 24 and provides a second electrical connection between the synchronizer unit 16 and the battery casing 12. The lower end of the connecting stud 72 is threaded into a metal plate 73 and the stud 72 and plate 73 are insulatively supported by means of an insulating bushing 74 and an insulating strip 76.

Attached to the metal plate 73 by means of screws 77 is a contacting member indicated in general by reference numeral 78 preferably constructed of spring material such as phosphor bronze. The contacting member 78 has an arm 79 extending to the right and an arm 81 extending to the left. The arm 81 as shown in Fig. 3 has a depending section 82 adapted to cooperate with the left hand end of the member 49, as will presently be described.

In operative relation with the arm 79 of the spring member 78 is an insulating pin 83, shown most clearly in Figs. 6 and 7, the lower end of which extends through a hole in the back plate 24a of the shell. In operative relation with the end of the pin 83 extending through the shell is a disc 84 pivotally mounted on a shoulder screw 86. The disc 84 has an offset portion 87 therein together with indicating marks 88 and 89, Fig. 2. With the disc 84 rotated to the position shown in Fig. 2, the lower end of pin 83 is allowed to enter the offset portion 87 under action of the spring arm 79. With the pin 83 in the recess of the plate 84 as shown in Fig. 6, the free end of the spring arm 79 is in the path of movement of the free end or moving arm of the spring 52, whereas with the pin 83 in contact with the flat portion of the disc 84, the free end of the spring arm 79 is elevated out of the path of movement of the moving arm of the spring 52 as shown in Fig. 7. Thus by rotating the disc 84 to bring either one of the indicating marks 88 and 89 into registry with the mark 91 on the back of the shell 24, the free end of the spring arm 79 is either in or out of the path of movement of the moving arm of the spring 52. The purpose of this adjustment of the position of the spring arm 79 will be apparent hereinafter. The extreme free end 54 of the spring 52 cooperating with the flange 44 engages a groove 90 which prevents the spring from slipping out of contact with the flange 44.

Having described the various elements and disposition thereof of the synchronizer unit, the operation will now be given. Let it first be assumed that the disc 84 is so positioned that the indication 88 is opposite the indication 91 and, as previously described, with the disc in this position the pin 83 moves the arm 73 of the contacting member 78 so that it is out of operative relation or the path of movement of the spring 52 as shown in Fig. 7. Also, let it be assumed that a photo flash bulb 14 is in the reflector 13, Fig. 1, and a battery (not shown) in the battery casing 12. Pushing the button 46 to the left as shown in Figs. 3 and 4 operates the synchronizer unit 16 to trip the shutter of the camera and ignite the photo flash bulb 14 in timed relation to the tripping operation of the shutter so that the two operations of bulb flashing and the shutter opening occur at the desired time.

During the first part of the movement of the button 46 to the left, the spring 51 moves the plunger rod 42 and the member 49 therewith or until the clearance between the projection 62 on the latch 58 and the notch 63 is taken up. Thereupon the sleeve 43 moves along the plunger rod 42 until the head 56 on the plunger rod comes into contact with the inside of the button 46 to take up the clearance thereat. Further movement of the button 46 to the left then moves the plunger rod 42 therewith and as the latching surface of the notch 63 on the member 49 is engaged with the projection 62 on the latch 58, this movement of the button 46 to the left compresses the spring 51. The movement of the button to the left also increases the tension of the spring 52 acting on the flange 44 of the sleeve 43. The latching of the member 49 by the latch 58 does not latch the plunger rod 42 as the same continues to move with the button 46.

After the button 46 and sleeve 43 have moved a predetermined distance to the left, the edge of the flange 44 comes into engagement with a sloping surface 92, Fig. 3, on the right hand end of the latch 58. Further movement of the flange 44 to the left cams the latch 58 in a downward direction against the action of its spring 59 to withdraw the latching projection 62 from out of the notch 63. As the projection 62 is withdrawn from the notch 63, the spring 51 is effective to slide the member 49 along the plunger rod 42 bringing the left hand end thereof against the shoulder 47 on the plunger rod. As the teeth 64 on the member 49 are in contact with the teeth 66 of the pinion 67 rotatable with the inertia disc 69, the movement of the member 49 to the left is slowed down an appreciable amount other than what it would be if the inertia disc 69 was not coupled thereto.

At the time the latch 58 is operated to release the member 49, the plunger rod 42 will have moved an amount sufficient to bring the shoulder 47 thereon a slight distance to the right of the end of the depending arm 82 on the contacting member 78. This movement of the plunger rod is not sufficient to trip the shutter on the associated camera, the collar 32 being adjusted on the sleeve 28 to take care of this, as heretofore described, and therefore, when the member 49 is released and moves to the left to strike the plunger rod at 47, the plunger rod 42 is operated further to the left which in turn operates the core 21 to trip the camera shutter. The last operation of the plunger rod in tripping the camera shutter is relatively fast as the member 49 strikes the same with a sharp blow and with sufficient energy to operate the same, the energy for operating the member 49 being derived from the spring 51 and the inertia of the disc 69. The inertia stored in the disc 69 during the first part of the movement of the member 49 assists in operating the plunger rod 42 in its tripping of the camera shutter.

Just as the member 49 reaches its extreme left hand position it contacts the end of the depending arm 82 of the contacting member 78 establishing a circuit therebetween to close a circuit from one pole of the battery in the casing 12, Fig. 1, through the photo flash lamp 14 and the synchronizer unit 16, back to the other pole of the battery. This circuit ignites the photo flash bulb 14 and after an interval of time depending upon the characteristics of the particular photo flash bulb, it reaches its maximum illumination at which time the camera shutter should be open to produce the best results. If it is assumed that the photo flash bulb 14 is of such a type that the time required for it to reach its maximum illumination after ignition is substantially equal to the time required for the camera shutter to operate after being tripped, the shutter will be open during the time the maximum illumination is being produced and accordingly the best result is obtained. However, should a photo flash bulb be used that takes a greater interval of time to reach its maximum illumination after the ignition thereof, the shutter would be operated too soon and the light in the photo flash bulb would not properly illuminate the object being photographed. To provide for the use of different types of photo flash lamps with different operating characteristics, the invention provides means for igniting flash lamps at predetermined times relative to the tripping of the camera shutter.

Assume that in the above described operation of the synchronizer unit, a photo flash bulb 14 was employed with a time light characteristic represented by the curve 93, Fig. 9, and that a time interval of approximately five milliseconds is required for the shutter to operate after the tripping thereof. Accordingly if the shutter were tripped and the photo flash bulb ignited at the same time, the shutter would be open while the particular bulb was producing its maximum illumination and the object photographed would be properly illuminated.

However, if a photo flash light 14 was employed with a time light characteristic represented by the curve 94 of Fig. 9, and was ignited at the time the shutter was tripped, the shutter would operate before the lamp had produced sufficient illumination and the object photographed would not be properly exposed. Accordingly, it is necessary to introduce some means of igniting the photo flash lamp some time prior to the tripping of the camera shutter and in accordance with the invention this is accomplished by means of positioning the disc 84, Fig. 2, so that the indication 89 registers with the indication 91. In this position the offset 87 in the disc is in registry with the insulating pin 83 and allows the spring arm 79 to spring downward into the path of the spring 52, as shown in Fig. 6. With the spring arm 79 in this position, contact is made between it and the spring 52 just as the member 49 is released. The contacting of the arm 79 and the spring 52 ignites the photo flash bulb a sufficient length of time before the tripping operation of the plunger core 21 to allow the flash bulb 14 to produce its maximum illumination at the time the shutter is at its maximum opening. Thus by merely changing the rotative position of the disc 84 to bring either one or the other of the indications 88 or 89 into registry with the indication 91, the synchronizer unit may be adapted to operate efficiently in conjunction with photo flash bulbs having different time characteristics. The rotative positioning of the disc is easily and readily made and does not require a complicated arrangement.

After the button 46 is operated to its extreme left hand position, it is returned to its normal right hand position under the action of the spring 52. As the button 46 and sleeve 43 start to move to the right, the right hand end of the sleeve engages the head 56 on the right hand end of the plunger rod 42 to move the same together with the member 49 to the right. On engagement of the flange 44 of the sleeve 43 with the right hand end 24b of the shell, the member 49 will have moved a sufficient distance to the right to enable the projection 62 of the latch 58 to enter the notch 63 under the action of the spring 59 and thus the mechanism is returned to its normal position by merely releasing the button 46.

A modified arrangement of attaching the release cable 17 to the synchronizer unit 16 is shown in Fig. 8. In this modification the casing 15 terminates in and is fixed to a collar 96 having internal threads 97. The threads 97 engage external threads 97' on a sleeve member 98 extending from the left hand end of the synchronizer unit 16. As in the preferred embodiment, the sleeve 98 guides the left hand end of the plunger rod 42 and the right hand end of the core 21 of the release cable 17. By threading the collar 96 along the sleeve 98 the effective length of the casing 17 relative to the core 21 may be varied to adjust for different shutters. When the collar 96 is correctly adjusted or positioned on the sleeve 98, a locking member 99 also threaded on the sleeve is employed to lock the collar in place. The collar 96 and locking member 99 are knurled for easier adjustment thereof.

It is obvious, of course, that various modifications of the invention shown in the drawings and described herein may be made without departing from the spirit or essential attributes thereof and it is desired, therefore, that only such limitations be placed thereon as are imposed by the prior art or are specifically set forth in the appended claims.

What is claimed is:

1. In a device for operating a camera shutter and a photoflash lamp in timed relation to each other, a cable release extending from said device to said camera shutter, a plunger rod, a sliding member slidable on said rod, a spring and a latch associated with said member, manually operable means for operating said plunger rod and during the operation thereof a first predetermined distance to store energy in said spring and move said sliding member into latching engagement with said latch, means operative by said manually operable means on the movement of said plunger rod more than said first predetermined distance to directly trip said latch whereupon the energy stored in said spring during the first predetermined movement of said plunger rod is effective to operate said sliding member to engage and further operate said plunger rod and cable release to trip said camera shutter, a source of electrical energy and means operated by said sliding member in timed relation to the said last operation of said plunger rod to complete a circuit from said source of electrical energy to said photoflash lamp.

2. In a device for operating a camera shutter and a photoflash lamp in timed relation to each other, a cable release extending from said device to said camera shutter, a plunger rod, a sliding member on said rod, a spring and a latch associated with said member, manually operable means for operating said plunger rod and during the operation thereof a first predetermined distance to store energy in said spring and move said sliding member into latching engagement with said latch, means operative by said manually operable means on the movement of said plunger rod more than said first predetermined distance to directly trip said latch whereupon the energy stored in said spring during the first predetermined movement of said plunger rod is effective to operate said sliding member to further operate said plunger rod and cable release to trip said camera shutter, a source of electrical energy, means operated by said sliding member concomitantly with the said last operation of said plunger rod to complete a circuit from said source of electrical energy to said photoflash lamp, a rotary inertia absorbing means including a flywheel and a pinion, means including teeth on said slidable member and said pinion for operating said inertia means by said slidable member and means including said inertia absorbing means for effecting the circuit closing operation and the shutter tripping operation in definite timed relation to each other.

3. In a device for operating a camera shutter and a photoflash lamp in timed relation to each other, a cable release extending from said device to said camera shutter, a plunger rod, a sliding member on said rod, a spring and a latch associated with said member, manually operable means for operating said plunger rod and during the operation thereof a first predetermined distance to store energy in said spring and move said sliding member into latching engagement with said latch, means operative by said manually operable means on the movement of said plunger rod more than said first predetermined distance to directly trip said latch whereupon the energy stored in said spring during the first predetermined movement of said plunger rod is effective to operate said sliding member to further operate said plunger rod and cable release to trip said camera shutter, a source of electrical energy, means operated by said sliding member concomitantly with the said last operation of said plunger rod to complete a circuit from said source of electrical energy to said photoflash lamp, a rotary inertia absorbing means including a flywheel and a pinion, means including teeth on said slidable member and said pinion for operating said inertia means by said slidable member, means including said inertia absorbing means for effecting the circuit closing operation and the shutter tripping operation in definite timed relation to each other, and means for varying the definite timed relation of said circuit closing and shutter tripping operations.

4. In a device for operating a camera shutter and a photoflash lamp in timed relation to each other, a cable release extending from said device to said camera shutter, a plunger rod, a sliding member on said rod, a spring and a latch associated with said member, manually operable means for operating said plunger rod and during the operation thereof a first predetermined distance to store energy in said spring and move said sliding member into latching engagement with said latch, means operative by said manually operable means on the movement of said plunger rod more than said first predetermined distance to directly trip said latch whereupon the energy stored in said spring during the first predetermined movement of said plunger rod is effective to operate said sliding member to further operate said plunger rod and cable release to trip said camera shutter, a source of electrical energy, means operated by said sliding member concomitantly with the said last operation of said plunger rod to complete a circuit from said source of electrical energy to said photoflash lamp, a rotary inertia absorbing means including a flywheel and a pinion, means including teeth on said slidable member and said pinion for operating said inertia means by said slidable member, means including said inertia absorbing means for effecting the circuit closing operation and the shutter tripping operation in definite timed relation to each other, and means for effecting said circuit closing operation independent of said inertia absorbing means.

5. In a device for operating a camera shutter and a photoflash lamp in timed relation to each other, a cable release extending from said device to said camera shutter, a plunger rod, a sliding member on said rod, a spring and a latch associated with said member, manually operable means for operating said plunger rod and during the operation thereof a first predetermined distance to store energy in said spring and move said sliding member into latching engagement with said latch, means operative by said manually operable means on the movement of said plunger rod more than said first predetermined distance to directly trip said latch whereupon the energy stored in said spring during the first predetermined movement of said plunger rod is effective to operate said sliding member to engage and further operate said plunger rod and cable release to trip said camera shutter, a source of electrical energy, means operated by said sliding member in timed relation to the said last operation of said plunger rod to complete a circuit from said source of electrical energy to said photoflash lamp, and means operative on the manual release of said plunger rod for returning the same together with said sliding member to normal position.

6. In a device of the type described, a slidable rod having normal and operated positions, a first resilient means for holding said rod in normal position, a second resilient means, manually operable means for directly moving said rod from said normal position to an intermediate position against the action of both said first and second resilient means and means operative thereafter and including said second resilient means for moving said rod from said intermediate position to said operated position for the purpose described, a rotary inertia absorbing means including a flywheel, means including said inertia absorbing means whereby the last movement of said rod is effected uniformly regardless of the rate of manually moving the same from said normal to said intermediate position.

7. In a device of the type described, a slidable rod having normal and operated positions, a first resilient means for holding said rod in normal position, a second resilient means, manually operable means for directly moving said rod from said normal position to an intermediate position against the action of both said first and second resilient means, means operative thereafter and including said second resilient means for moving said rod from said intermediate position to said operated position for the purpose described, a rotary inertia absorbing means, including a flywheel, means including said inertia absorbing means whereby the last movement of said rod is effected uniformly regardless of the rate of manually moving the same from said normal to said intermediate position, and means including said first resilient means operative on the release of said manually operative means for returning said rod from said operated position to said normal position.

8. In a device of the type described for operating a camera shutter and a photoflash lamp in timed relation, a movable plunger rod having a normal and an operated position, the movement of which from said normal to said operated position effects tripping of said camera shutter, a contacting means in said device for completing a circuit from a source of electrical energy to said photoflash lamp, manually operable means for directly moving said plunger rod from said normal position to an intermediate position, resilient means conditioned during the movement of said rod to said intermediate position for moving said rod from said intermedate postion to said operative position, a rotatable inertia absorbing means including a flywheel, means including said inertia absorbing means whereby said resilient means moves said rod at a predetermined rate regardless of the rate of movement from said normal to said intermediate position, and means operative during the movement of said rod from said intermediate position to said operative position to effect tripping of said camera shutter and the closing of said contacting means to establish a circuit to said photoflash lamp.

9. In a device of the type described for effecting the opening of a camera shutter during the maximum illumination of photoflash lamps having different ignition-maximum illumination time characteristics, contacting means in said device for completing a circuit from a source of electrical energy to a photoflash lamp, a movable member in said device, manually operable means effective during a single operation thereof in a single direction to tension said member for operation and thereafter release the same for operation, the operation of which effects tripping of said camera shutter and the closing of said contacting means, a rotatable inertia means including a flywheel and a gear, teeth on said movable member engageable with said gear to connect said inertia means with said movable member, and means including said inertia means for timing the said two operations of said movable member with respect to each other in accordance with the ignition-maximum illumination time characteristic of the photoflash lamp employed.

10. In a device of the type described for effecting the opening of a camera shutter during the maximum illumination of photoflash lamps having different ignition-maximum illumination time characteristics, contacting means in said device for completing a circuit from a source of electrical energy to a photoflash lamp, a movable member in said device, manually operable means effective during a single operation thereof in a single direction to tension said member for operation and thereafter release the same for operation, the operation of which effects tripping of said camera shutter and the closing of said contacting means, a rotatable inertia means including a flywheel and a gear, teeth on said movable member engageable with said gear to connect said inertia means with said movable member, means including said inertia means for timing the said two operations of said movable member with respect to each other in accordance with the ignition-maximum illumination time characteristic of the photoflash lamp employed, and adjustable means in said device to condition said contact means to close said photoflash lamp circuit substantially simultaneously with the release of said movable member independently of said movable member.

MORRIS SCHWARTZ.
WILLIAM CASTEDELLO.